Oct. 15, 1968 A. C. KOETT 3,405,436

METHOD OF AND APPARATUS FOR SECURING FASTENER MEANS

Filed Nov. 13, 1964 13 Sheets-Sheet 1

INVENTOR.
ALBERT C. KOETT
BY
Kinney and Schenk
ATTORNEYS

Oct. 15, 1968 A. C. KOETT 3,405,436

METHOD OF AND APPARATUS FOR SECURING FASTENER MEANS

Filed Nov. 13, 1964 13 Sheets-Sheet 2

INVENTOR.
ALBERT C. KOETT
BY Kinney and Schenk
ATTORNEYS

Oct. 15, 1968 A. C. KOETT 3,405,436

METHOD OF AND APPARATUS FOR SECURING FASTENER MEANS

Filed Nov. 13, 1964 13 Sheets-Sheet 3

INVENTOR.
ALBERT C. KOETT
BY Kinney and Schenk
ATTORNEYS

Oct. 15, 1968 A. C. KOETT 3,405,436

METHOD OF AND APPARATUS FOR SECURING FASTENER MEANS

Filed Nov. 13, 1964 13 Sheets-Sheet 4

INVENTOR.
ALBERT C. KOETT
BY Kinney and Schenk
ATTORNEYS

INVENTOR.
ALBERT C. KOETT
BY Kinney and Schenk
ATTORNEYS

METHOD OF AND APPARATUS FOR SECURING FASTENER MEANS

Filed Nov. 13, 1964 13 Sheets-Sheet 6

INVENTOR.
ALBERT C. KOETT
BY
Kinney and Schenk
ATTORNEYS

Oct. 15, 1968 A. C. KOETT 3,405,436

METHOD OF AND APPARATUS FOR SECURING FASTENER MEANS

Filed Nov. 13, 1964 13 Sheets-Sheet 7

INVENTOR.
ALBERT C. KOETT
BY
Kinney and Schenk
ATTORNEYS

INVENTOR.
ALBERT C. KOETT
BY Kinney and Schenk
ATTORNEYS

INVENTOR.
ALBERT C. KOETT
BY
Kinney and Schenk
ATTORNEYS

METHOD OF AND APPARATUS FOR SECURING FASTENER MEANS

Filed Nov. 13, 1964 13 Sheets-Sheet 10

INVENTOR.
ALBERT C. KOETT
BY
Kinney and Schenk
ATTORNEYS

INVENTOR.
ALBERT C. KOETT
BY
Kinney and Schenk
ATTORNEYS

INVENTOR.
ALBERT C. KOETT
BY
Kinney and Schenk
ATTORNEYS

METHOD OF AND APPARATUS FOR SECURING FASTENER MEANS

Filed Nov. 13, 1964 13 Sheets-Sheet 13

INVENTOR.
ALBERT C. KOETT
BY
Kinney & Schenk
ATTORNEYS

United States Patent Office 3,405,436
Patented Oct. 15, 1968

3,405,436

METHOD OF AND APPARATUS FOR SECURING FASTENER MEANS

Albert C. Koett, 2112 Glenside Ave., Cincinnati, Ohio 45212

Filed Nov. 13, 1964, Ser. No. 411,026
19 Claims. (Cl. 29—432.1)

ABSTRACT OF THE DISCLOSURE

The device is a light-weight portable hand tool to be taken to a job, including forming dies arranged for driving a nut or fastener intermittently through a metallic sheet with displacement of a slug, by means of high frequency vibratory impulses which, in the same single operation, effect intermittent forming and impacting of the material of the sheet about and against the nut or fastener, to produce a permanent mounting thereof upon said sheet.

This invention relates to a method of and means for securing a pre-formed fastener element to one or more sheets of metal, wherein the fastener element literally cuts its own way through the sheets after which it is securely anchored thereto.

An object of the invention is to provide portable means for effecting the foregoing attachment of a fastener element to one or more sheets of metal. Heretofore fastener elements such as, by way of example, pierce nuts have been secured to retaining sheets by means of expensive, cumbersome, heavy duty punch-press operations.

A further object of the present invention is to provide a compact, light weight, portable tool having self-contained means for storing a plurality of fastening elements, means for selectively presenting the fastener elements one at a time to an axially reciprocable ram head, which is subjected to high frequency vibrations which literally drive the fastening element through a metal sheet after which adjacent portions of the sheet are automatically peened into tight engagement with the fastener element for securely and permanently affixing it to the sheet.

A further object of the invention is to teach a method of applying pierce-type fastening elements to one or more metal sheets with great rapidity and precision, and with the formation of a tight and durable connection between the fastener elements and sheet(s).

Still a further object of the invention is to provide an improved method and apparatus for utilizing a self-piercing fastening element for punching an opening in a metal sheet and then permanently anchoring the nut within the opening by virtually flowing the metal of the sheet about the fastener element, as a single, automatic, operation.

Still another object of the invention is to provide an inexpensive, simple, yet highly effective, reliable and durable apparatus which is portable and light weight in character for obtainment of the foregoing objectives.

A further object of the invention is to provide an apparatus for and method of securing a fastener element such as, by way of example, a pierce nut directly and permanently to a single sheet of metal and/or for applying such a nut to two or more sheets of metal for permanently interconnecting said sheets by said fastener element.

These and other objects are attained by the means described herein and as disclosed in the accompanying drawings in which.

Figures 13, 14:
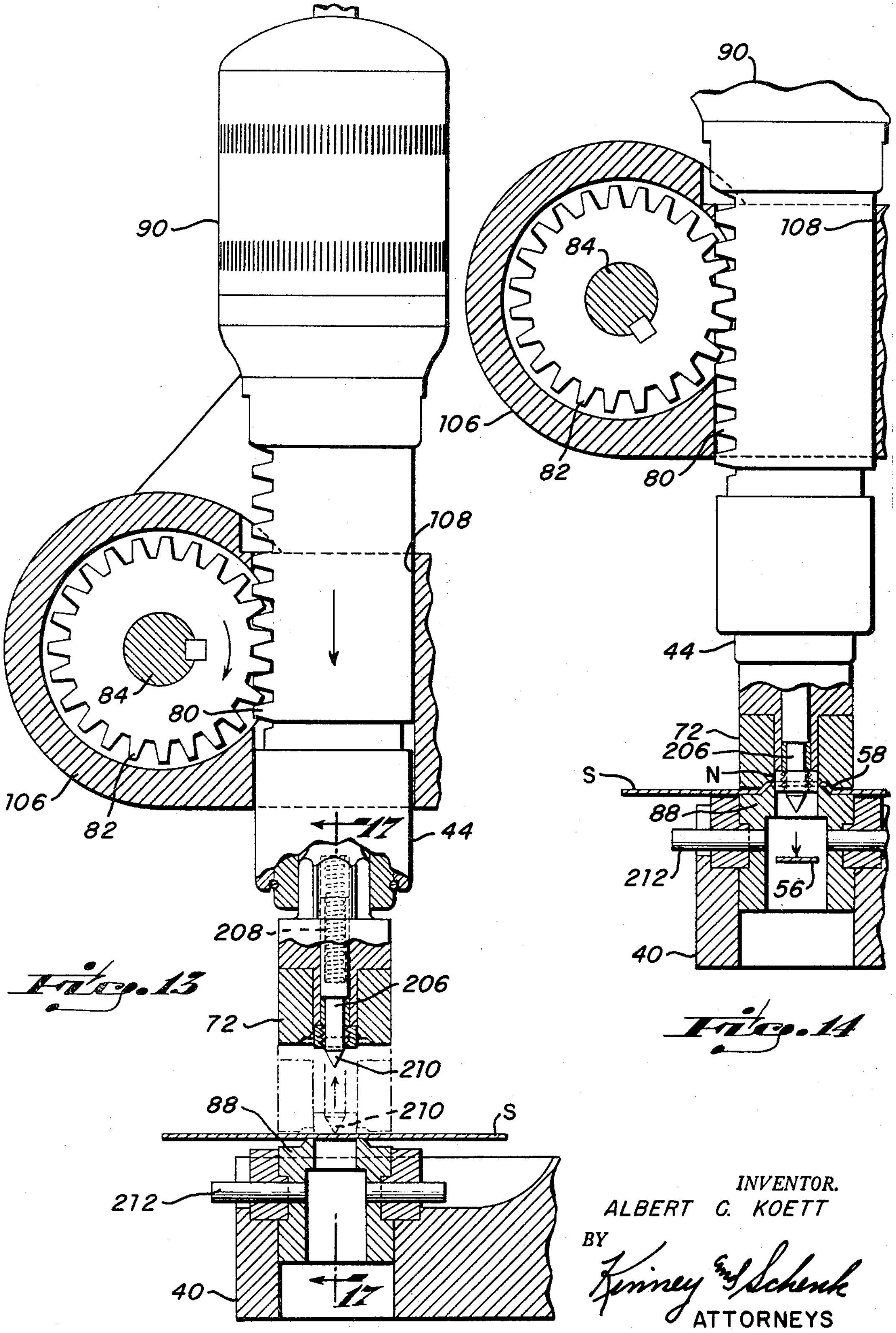

FIG. 13 in an enlarged side view of a punch and die mechanism for setting a nut, certain parts being shown in cross-section.

FIG. 14 is a view similar to FIG. 13, showing an advanced position of the parts.

Figure 1:
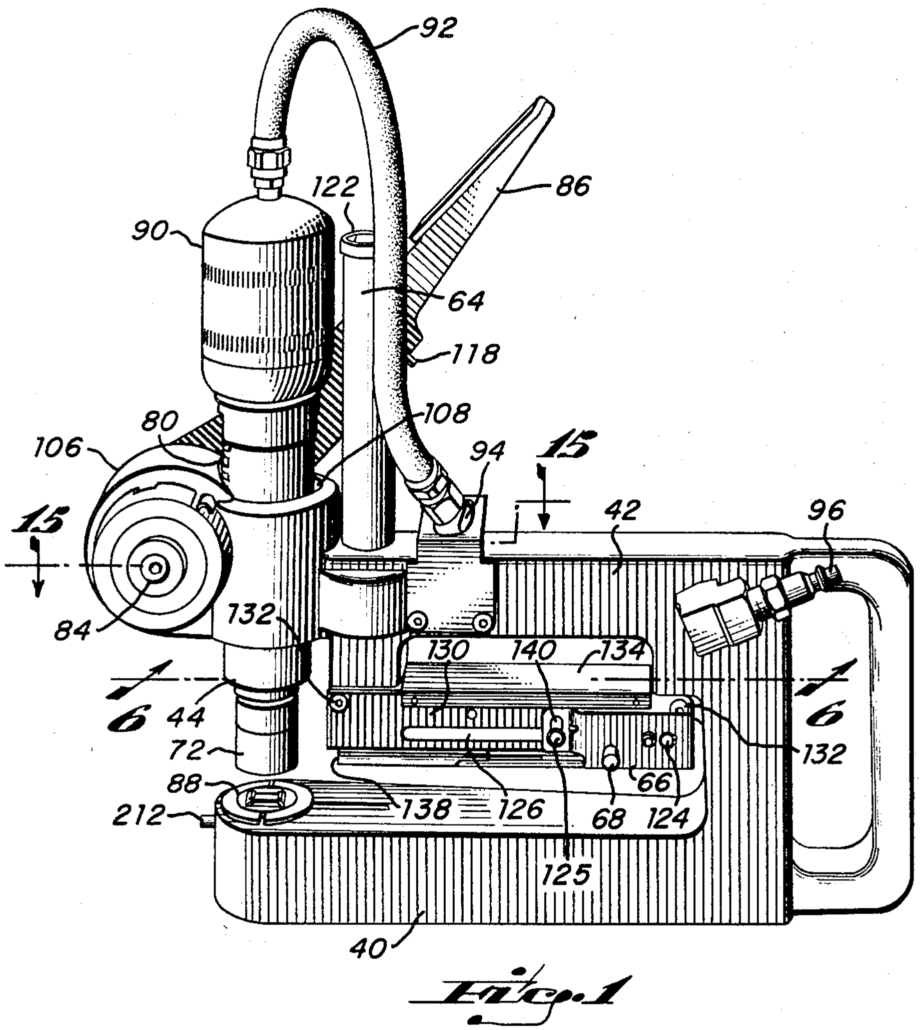
FIG. 1 is a side perspective view of a device embodying the present invention.
Figure 15:
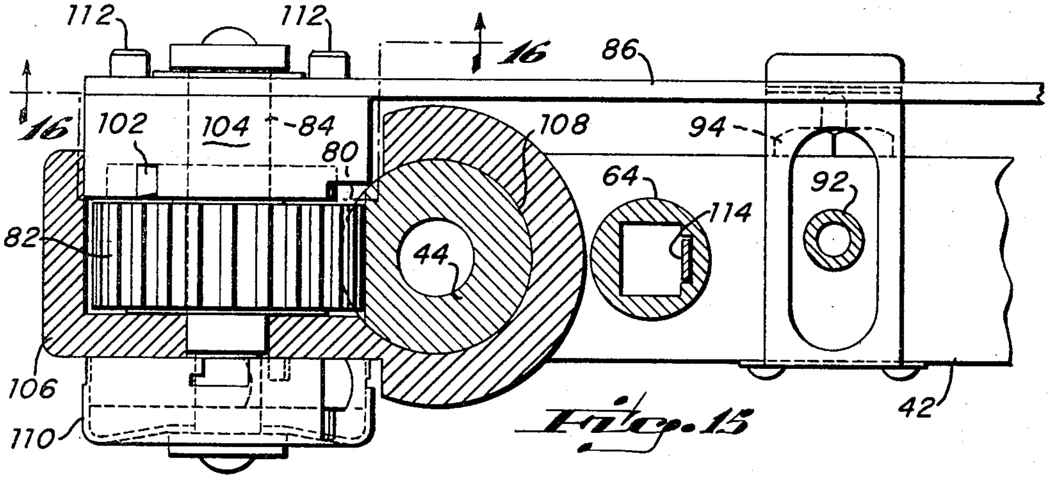

FIG. 15 is a cross-section taken on line 15—15 of FIG. 1.

Figure 16:
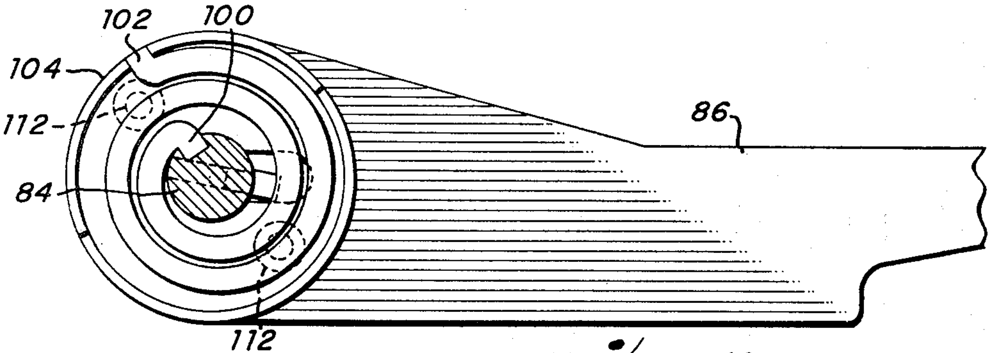

FIG. 16 is a cross-section taken on line 16—16 of FIG. 15.

Figures 17, 18:
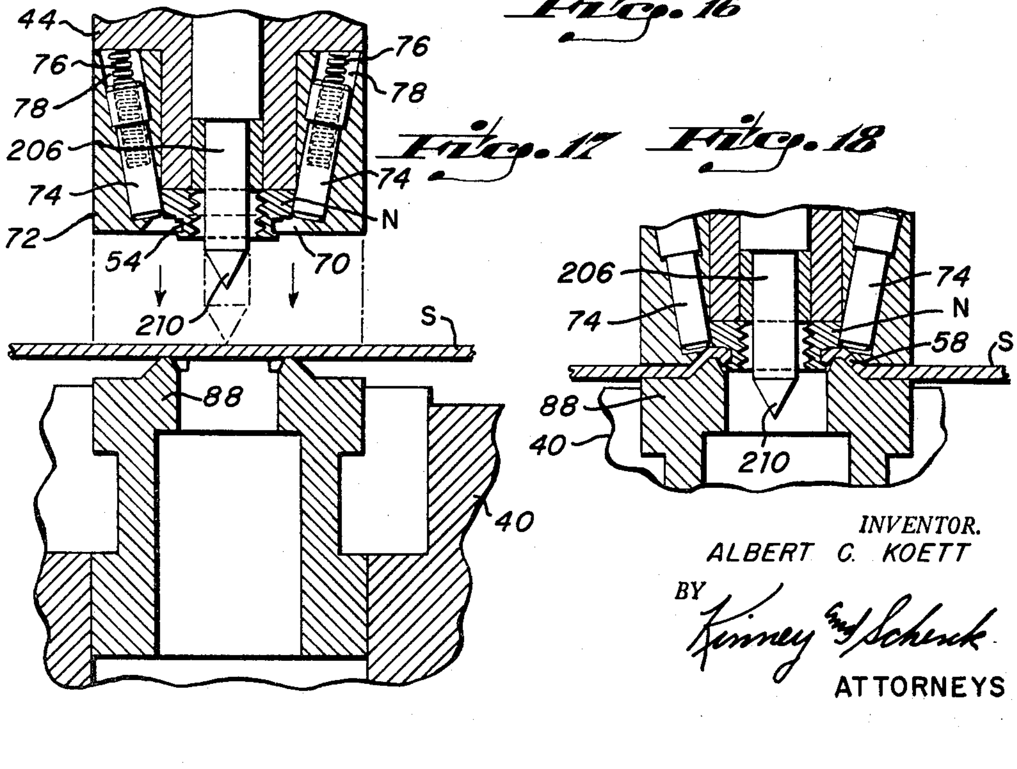

FIG. 17 is an enlarged cross-sectional view taken on line 17—17 of FIG. 13, showing a nut held by a chuck in position to be driven through a workpiece or sheet superposed upon a die element.

FIG. 18 is a view similar to FIG. 17, at completion of the nut setting operation upon the sheet.

Figure 19:
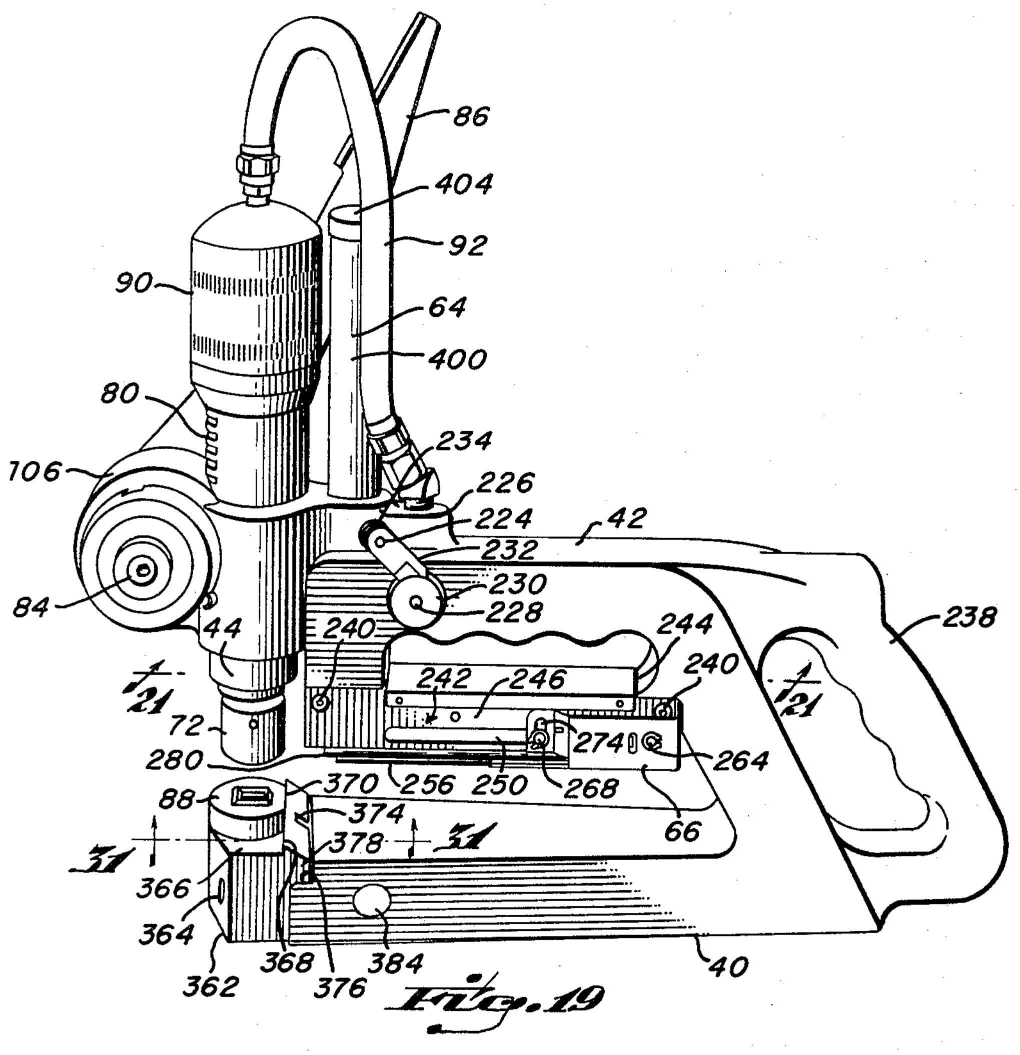

FIG. 19 is a side perspective view of the FIG. 1 device in slightly modified form.

Figure 20:
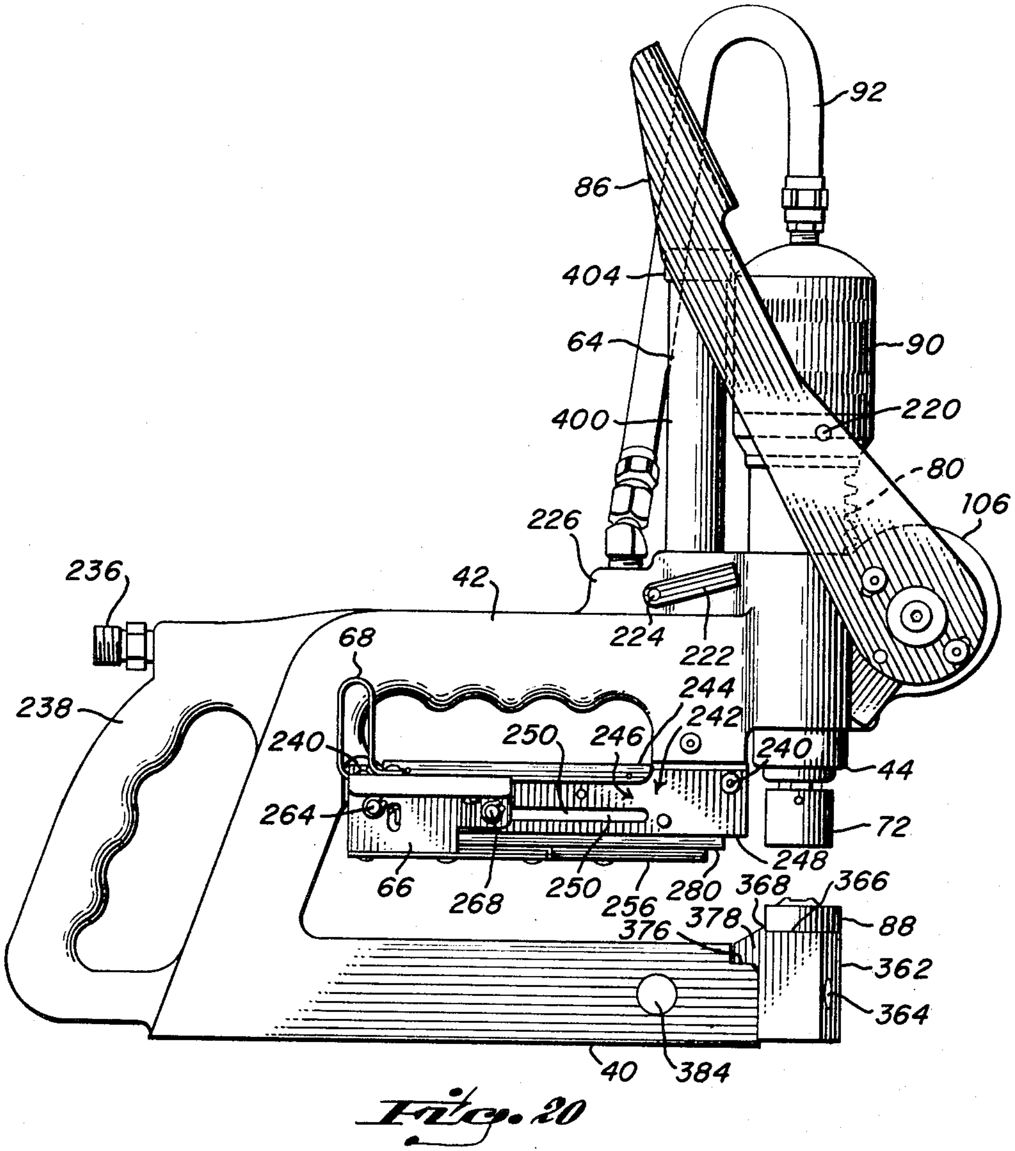

FIG. 20 is a side elevation of the opposite side of the FIG. 19 device.

Figures 21, 24:
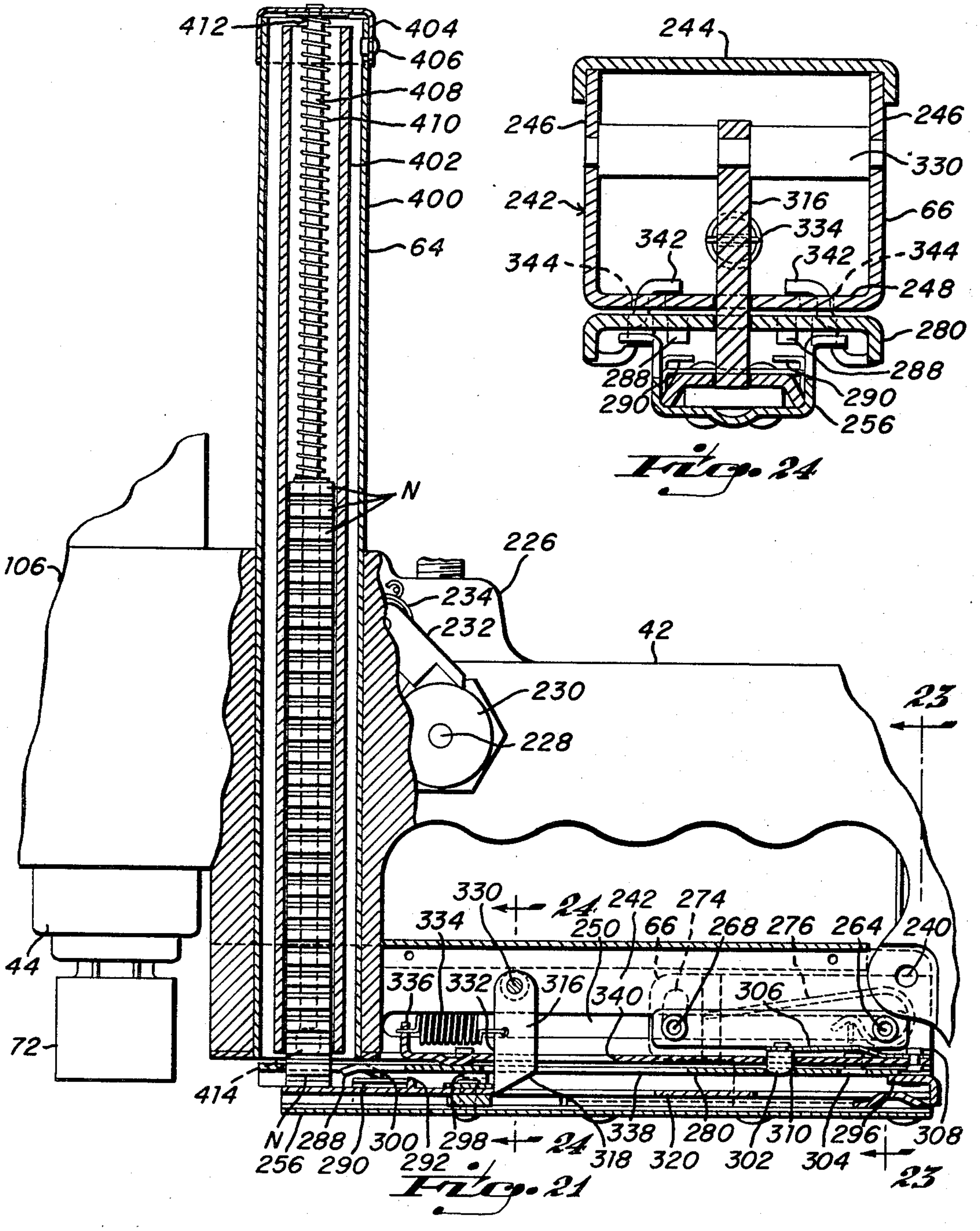

FIG. 21 is a vertical cross-section taken on line 21—21 of FIG. 19, showing the nut advancing means in retracted position.

Figure 22:
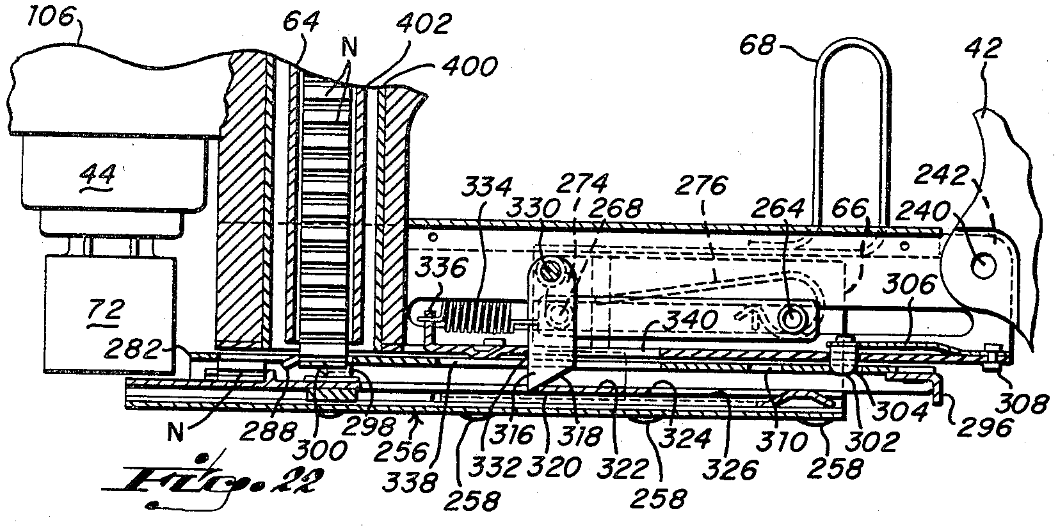

FIG. 22 is a view similar to FIG. 21, showing the nut partly advanced by the nut advancing means.

Figure 23:
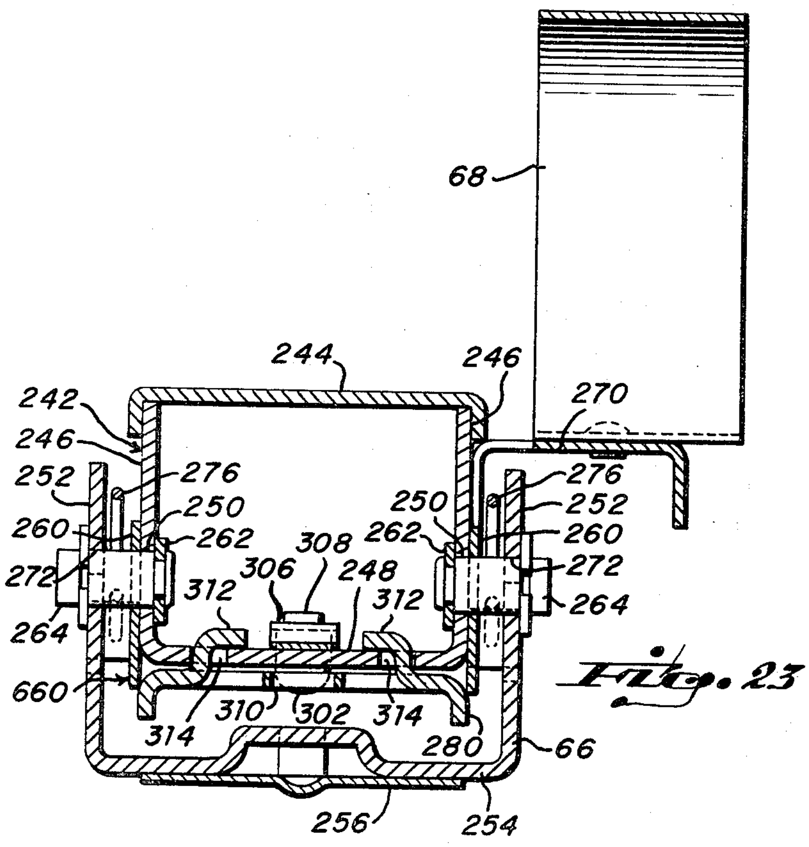

FIG. 23 is an enlarged cross-sectional view taken on line 23—23 of FIG. 21.

FIG. 24 is an enlarged cross-sectional view taken on line 24—24 of FIG. 21.

Figure 25:
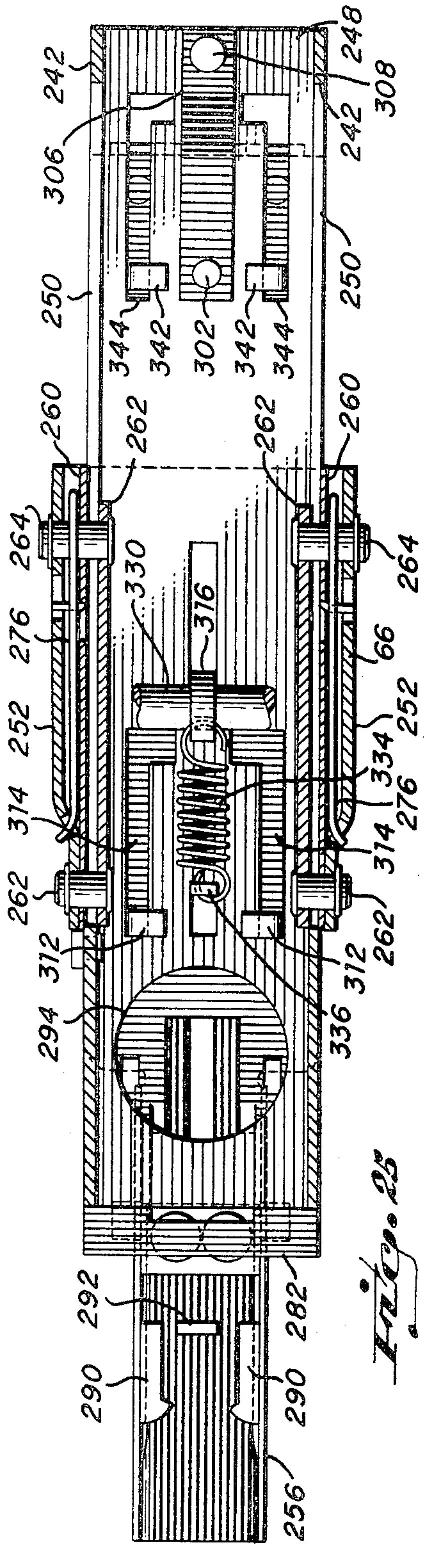

FIG. 25 is a horizontal cross-section of the nut advancing means of FIG. 21, and showing the fully advanced position thereof, the nut being omitted.

Figures 26, 27:
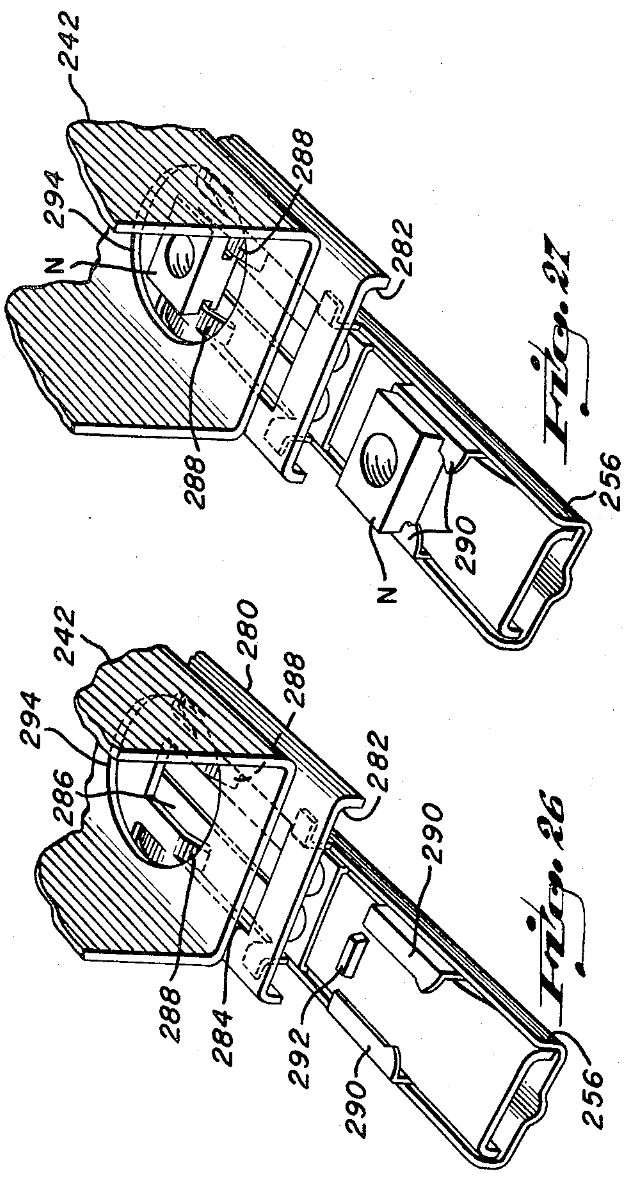

FIG. 26 is a fragmentary perspective view of the nut advancing means of FIG. 21, with nuts omitted.

FIG. 27 is a view similar to FIG. 26, with nuts undergoing feeding by the nut advancing means.

Figure 28:
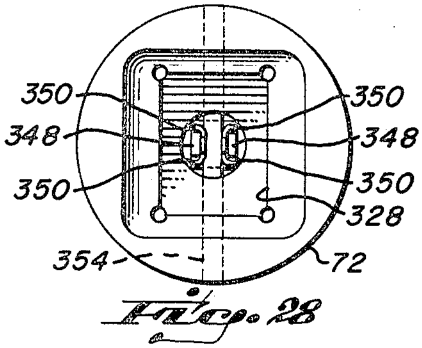

FIG. 28 is a bottom plan view of the chuck located above the lower die element of FIG. 19.

Figure 29:
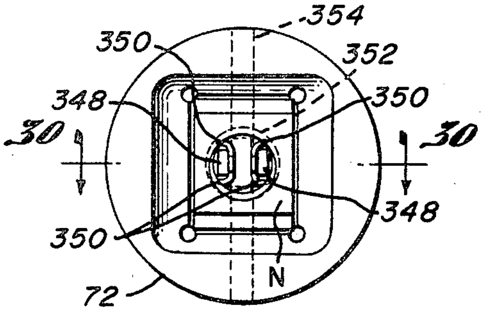

FIG. 29 is a view similar to FIG. 28, showing a nut releasably held by the chuck.

Figure 30:
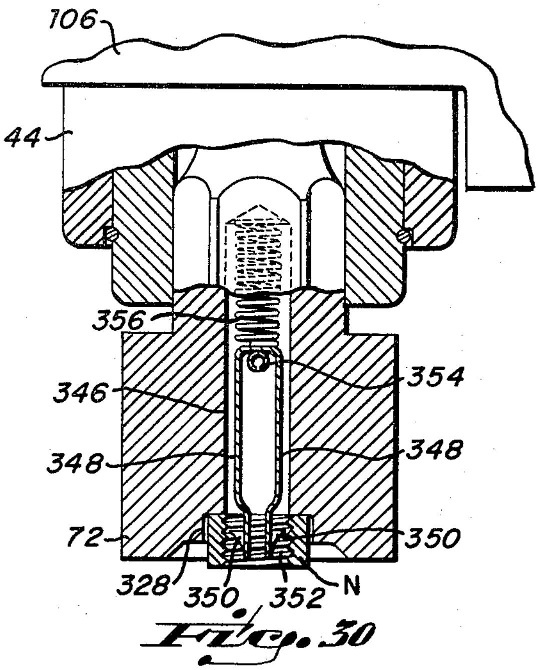

FIG. 30 is an enlarged cross-sectional view taken on line 30—30 of FIG. 29.

Figure 31:
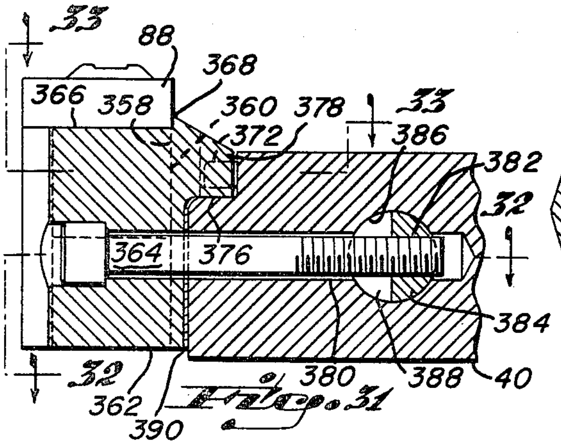

FIG. 31 is an enlarged cross-sectional view taken on line 31—31 of FIG. 19.

Figure 32:
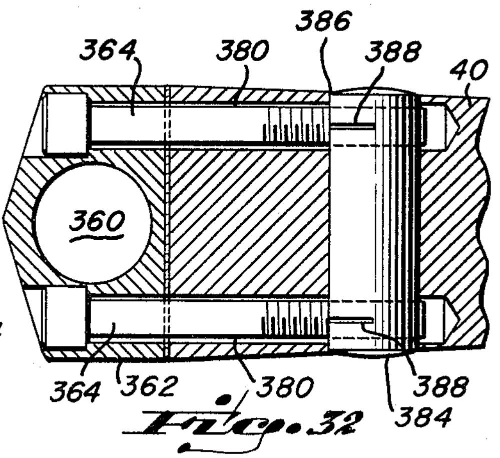

FIG. 32 is a cross-sectional view taken on line 32—32 of FIG. 31.

Figure 33:
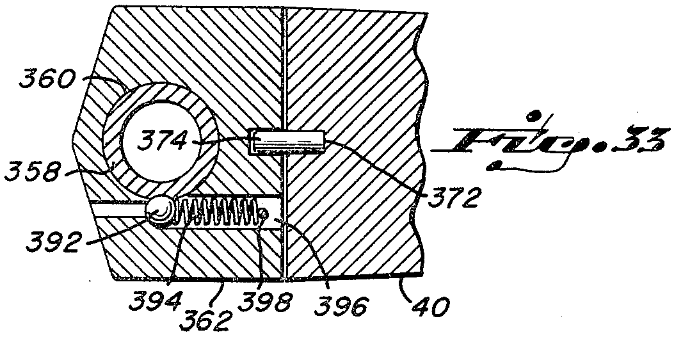

FIG. 33 is a cross-sectional view taken on line 33—33 of FIG. 31.

The present invention will be now described in terms of a nut setter, it being understood that a pierce nut has been selected as a typical example of a fastener element as contemplated by the present invention; and the means for securing such a fastener element, pierce nut will, by way of example, be hereinafter referred to as a nut setter.

Figures 2, 3, 4, 5:
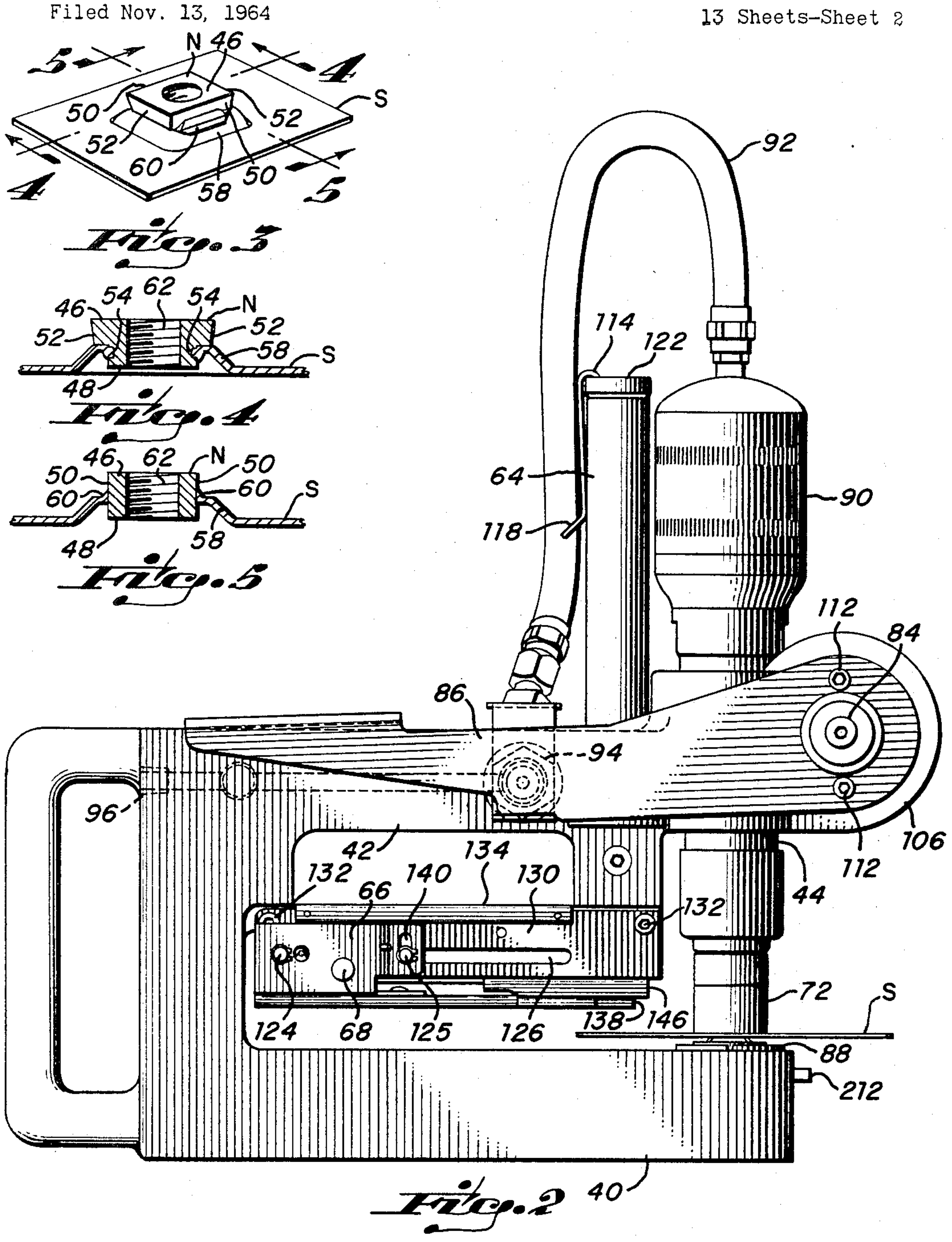
FIG. 2 is a side elevational view of the same, showing the opposite side, and indicating an operative condition of the parts for setting a nut within a sheet or panel.
FIG. 3 is a perspective view of a nut applied to a metal sheet according to the invention.
FIG. 4 is a cross-section taken on line 4—4 of FIG. 3.
FIG. 5 is a cross-section taken on line 5—5 of FIG. 3.

In general, the nut setter comprises a frame of light weight metal, including a base portion 40, an arbor or arm 42 overlying the base portion, and means at the forward ends of the arbor and base portion for setting a pierce nut N within the body of a sheet S of metal in accordance with FIGS. 3, 4 and 5. The operation consists in feeding a nut from a magazine to a chuck above the work sheet, lowering the nut into initial contact with the work sheet, and then applying a succession of rapid or high frequency blows to the nut for causing it to pierce the work sheet and for flowing the metal of the sheet adjacent the nut snugly about and into firm contact with the nut to establish a tight and durable connection. Forming dies carried by the base 40 and spindle 44 are utilized in establishing the connection.

The pierce nut N, best illustrated by FIGS. 3, 4 and 5, may be formed from suitable bar stock in an automatic machine. The nut in plan is preferably oblong and rectangular, and is reduced in cross-section intermediate it upper and lower parallel faces 46 and 48. The sides 50—50 of the nut preferably are parallel to one another, with plane surfaces. The ends 52—52 are tapered slightly inwardly toward the lower face 48, and intermediate the upper and lower faces said ends are provided with elongate recesses 54 extending from end to end of the nut for receiving opposite edges of the opening formed in the sheet incident to driving the nut into the sheet. It will be understood by referring to FIG. 14, that the nut when driven into the sheet displaces a slug 56 which the nut replaces; then as the metal is rapidly hammered alongside the nut, such metal is driven or flowed into the recesses 54 to clinch the nut.

It will be noted further that nut N preferably rests upon a dome 58 formed from the metal of sheet S, this being done by means of forming dies as will be explained hereinafter. The characters 60 indicate deformities in the sheet hugging the sides of the nut, such deformities taking the shape of lugs projected by the succession of hammer blows which upset the metal of the sheet as the nut undergoes setting. Each nut may have an interior machine thread 62.

The character 64 indicates a magazine for nuts to be fed to the hammer and die area of the machine, a nut being fed incident to each manual forward and return reciprocation of a slide or carriage 66 slung beneath the arbor 42. The carriage may carry a handle or finger piece 68 (FIGS. 22 and 23), for the purpose.

Feeding of a nut from the magazine places the nut within the grasp of a chuck (FIGS. 17 and 18), which releasably secures the nut to the lower end of spindle 44 in position for the spindle to lower the nut and drive it bodily into the work sheet S.

As FIG. 17 indicates, the tapered head portion of nut N may be held within the recess 70 of a die 72, by a plurality of slanted fingers in the form of retractable pins 74 which are normally extended by means of light springs 76, to bear laterally against the tapered ends 52—52 of the nut. Pins 74 are supported within bores 78 of die 72 with sufficient clearance or play, to permit a nut N inserted into recess 70 from beneath, to momentarily displace the pins as the nut approaches the spindle end, whereupon the pins are projected by springs 76 to embrace the head of the nut in the manner of FIG. 17. The pins or fingers releasably hold the nut to the spindle until the nut is affixed to the work sheet (FIG. 18), and the spindle is retracted from said sheet. Retraction of the spindle withdraws the pins or fingers for releasing the nut.

Advancement of spindle 44 onto sheet S may be effected by means of a rack and pinion gear best shown in FIGS. 14 and 15, wherein 80 indicates a rack on spindle 44 engaged by a pinion 82 which elevates and lowers the spindle as shaft 84 is rocked by means of hand lever 86, the latter being accessible at one side of the machine. Lowering the spindle manually advances the lower reduced end of nut N into engagement with the upper surface of work sheet S, and simultaneously therewith the nut-carrying chuck is subjected to a plurality of high frequency blows, impacts or vibrations which literally push the forward, or lower face of the nut into and through sheet S, displacing a slug 56 (FIG. 14), and bringing the reduced recessed portion 54 of the nut into register with the opening in the sheet formed by displacement of the slug.

Further advancement of the vibrating chuck causes die 72 to deform the sheet over lower die 88, which cooperates therewith to form the dome 58 surrounding the nut. The succession of high frequency blows from the hammer 90 virtually "flows" the metal of the sheet into the nut recesses 54—54 and against the sides of the nut, to establish a firm and solid connection characterized by great durability and resistance to loosening.

Hammer 90 is of conventional construction and application, and may be actuated pneumatically by air under pressure introduced thereto through a hose or tube 92, the latter having connection with a fitting 96 supplied with air from a suitable compressor. Duration of the high frequency hammer vibration may be controlled by a valve 94, conventional in design, which is held open for actuating the hammer so long as lever 86 is held in the operative or depressed position of FIG. 2. The inoperative position of lever 86 is illustrated by FIG. 1, and in this position of the lever the valve 94 is closed and hammer 90 is inactive. The hammer may be activated electrically, if desired.

From the foregoing it will be understood that vibration of hammer 90 is effected whenever the dies 72 and 88 are in the position of the dotted lines of FIG. 13. When the dies are separated as in the solid lines of FIG. 13, the air hammer is unactivated.

Means may be provided for yieldingly restoring hand lever 86 to the inoperative or elevated position of FIG. 1 when not manually depressed or lowered to the operative position. Such means may comprise a coiled spring 98 (FIG. 16), surrounding the shaft 84 and having one end 100 anchored to the shaft, whereas the opposite end 102 is anchored to a stationary guard piece 104 fixed in relation to a hollow arbor extension 106 that houses pinion 82. Arbor extension 106 includes also a vertical bore 108 in which spindle 44 may be reciprocated.

The character 110 indicates an adjusting member for regulating the tension of spring 98, and is conventional in form and operation. Pins or other suitable fasteners 112 may be employed to secure lever 86 to pinion 82, so that spindle 44 will move correspondingly with lever 86.

Figure 6:
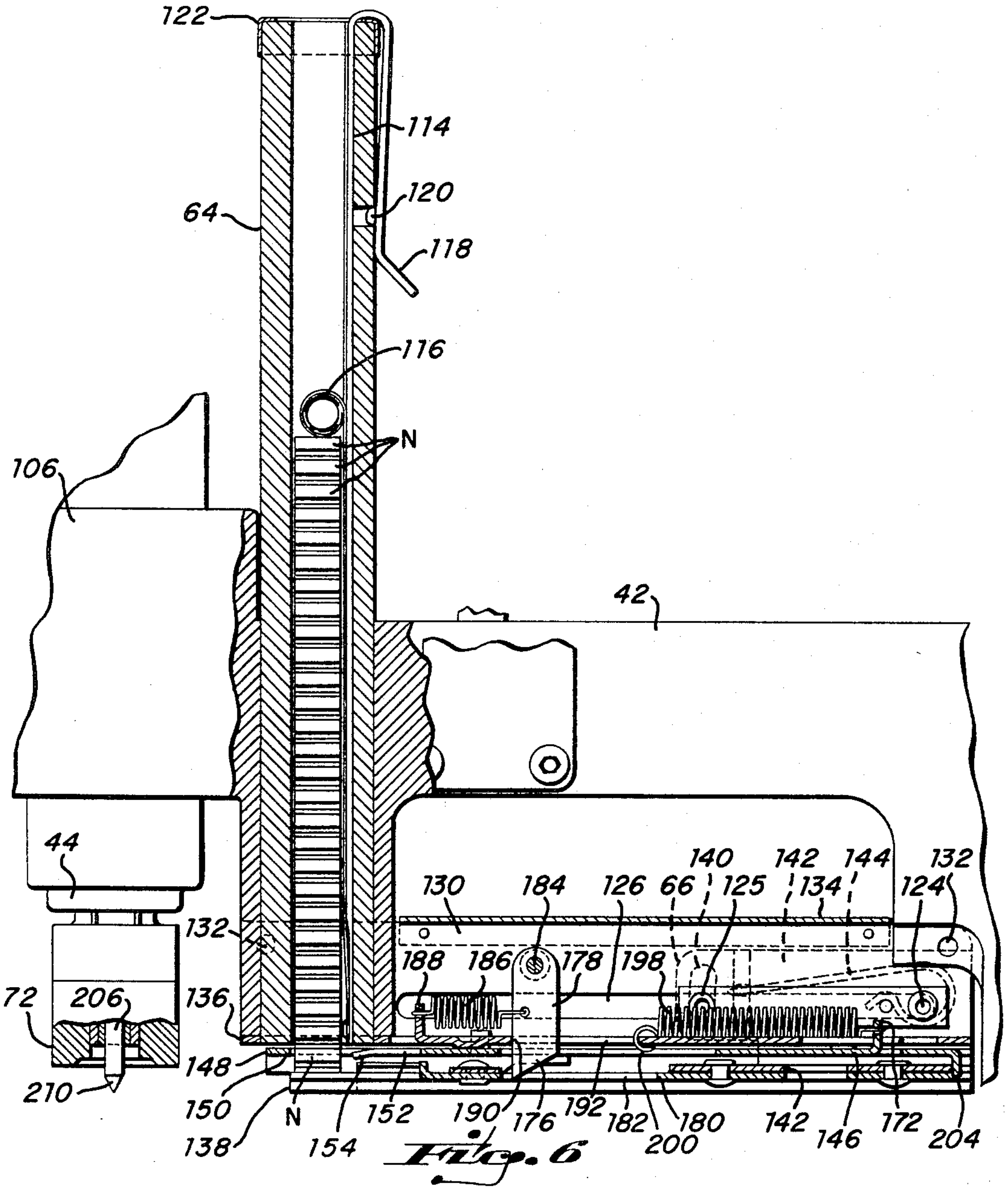
FIG. 6 is a vertical cross-sectional view, on an enlarged scale, taken on line 6—6 of FIG. 1.

With reference to FIGS. 2 and 6, the numeral 114 indicates a leaf spring having at one end a coil 116 tending constantly to yieldingly depress the nuts N in magazine 64, as an aid to effective feeding of nuts to the die head. A handle 118 facilitates removal of spring 114 for recharging the magazine with nuts, and a detent 120 on the handle serves to releasably hold the spring normally in position to depress the nuts. The numeral 122 indicates a removable cap for the top of the nut magazine.

FIGS. 6 to 12, inclusive, illustrate in detail one form of means which may be employed to feed nuts N into position for attachment to sheet S. Carriage 66 of the nut feeder carries transverse pins 124 and 125 adapted to ride in horizontal guideways such as elongated slots 126 formed in the spaced parallel legs 128 of a stationary elongate housing 130 secured at 132 to arbor 42. The housing may carry a cover 134 to protect the inner parts from dirt or the like, and includes also a bottom wall 136 parallel to the cover.

Figure 7:
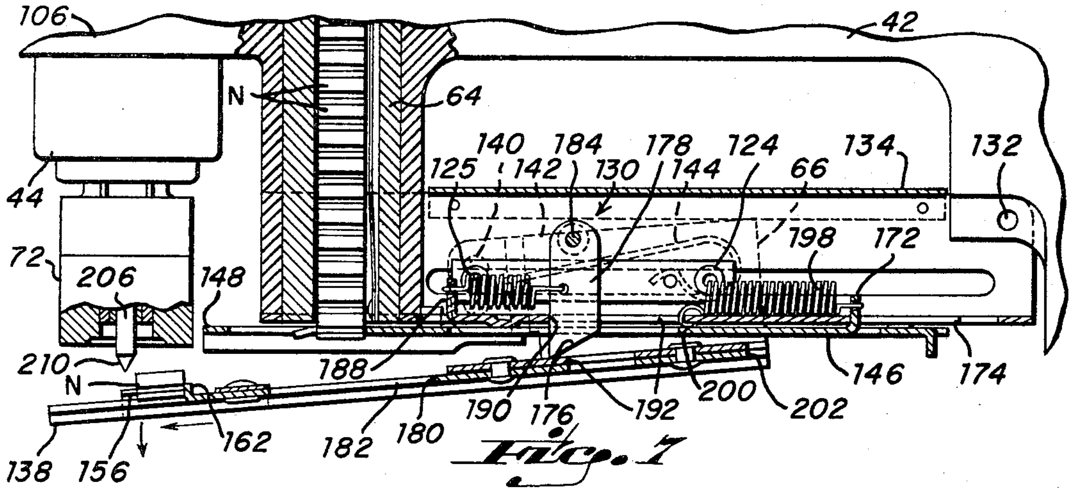
FIGS. 7, 8 and 9 are views similar to FIG. 6, showing the sequential steps in applying a nut to a sheet.
Figure 8:
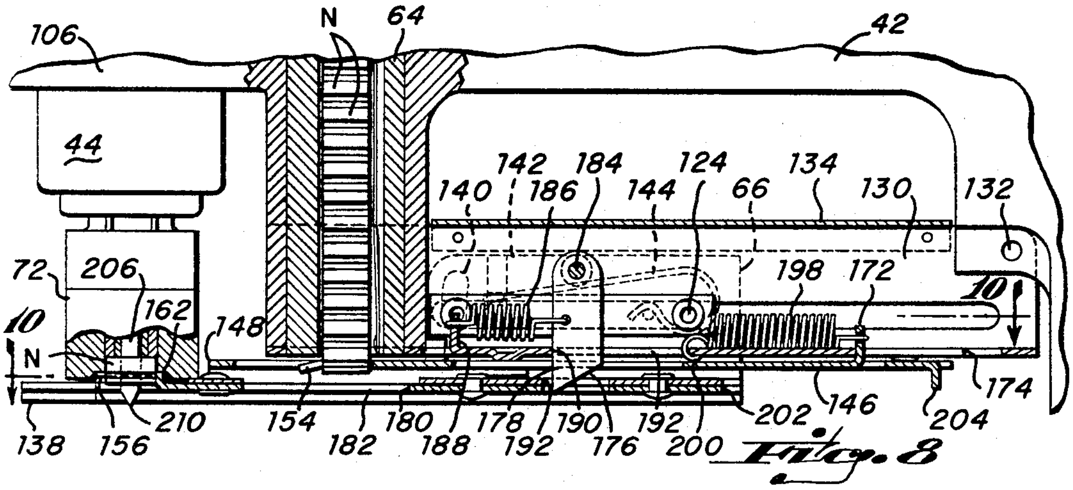

Carriage 66 has fixed thereto a forwardly extending tongue 138 which may be bifurcated as shown, the tongue being of sufficient length to deliver a nut to spindle die 72 upon full forward shifting of the carriage (FIGS. 7 and 8). The normal retracted condition of the carriage is illustrated by FIG. 6, wherein tongue 138 is parallel to arbor 42 and housing 130, and is retracted from die 72. In advancing the carriage to deliver a nut to the die, the carriage and tongue 138 first move forwardly to withdraw a nut from magazine 64; then as indicated by FIG. 7 the tongue is lowered while advancing, until the nut is in vertical alignment with die 72; whereupon the tongue snaps upwardly to project the nut into the die recess according to FIG. 8; and finally, the tongue is withdrawn to the FIG. 6 position after having deposited the nut in the die recess.

In order to perform as above related, carriage 66 is endered tiltable about its supporting pins 124 to a limited extent, by providing upright elongated holes 140 in the side walls 142—142 of the carriage where the pins 125 project therethrough. Thus, carriage 66 and tongue 138 may be tilted from the FIG. 6 horizontal position to the inclined position of FIG. 7. A spring 144 is arranged to yieldingly urge the tongue and carriage always to the horizontal position of FIG. 6 or FIG. 8. Advancement and retraction of carriage 66 may be limited by the length of slots 126.

Intermediate the tongue 138 and the bottom wall 136 of housing 130 is disposed a reciprocable sub-slide 146 in the general form of an elongate plate, the forward end 148 of which is provided with a two-stage aperture comprising sections 150 and 152. Section 150 is of sufficient length and width to permit passage therethrough of a nut N, whereas section 152 is of limited width such as to support a nut by its head, as in FIG. 12. Intermediate the aperture sections 150 and 152, there is provided a pair of spaced inclines 154 to be traversed by a nut N in passing from section 152 to section 150 of the sub-slide forward aperture.

Figures 10, 11, 12:
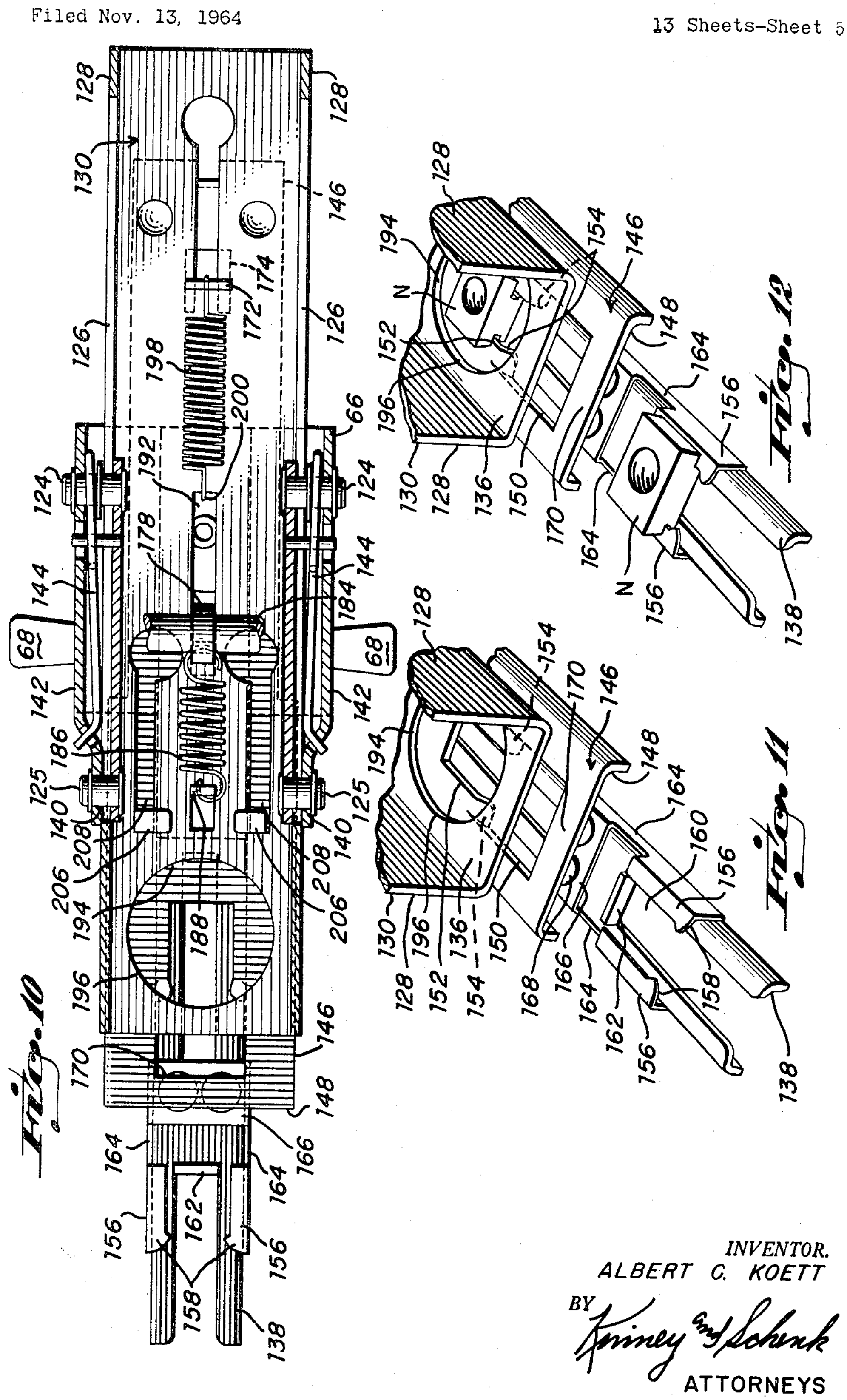
FIG. 10 is an enlarged cross-sectional view taken on line 10—10 of FIG. 8.
FIG. 11 is a fragmental perspective view of a nut advancing mechanism.
FIG. 12 is a view similar to FIG. 11, showing nuts in process of advancement.

It may here be noted by reference to FIG. 6, that the lowermost nut N of the stack normally rests upon the top of tongue 138, while it is loosely confined by section 150 of the sub-slide aperture. Advancement of the carriage 66 to the left advances also the tongue 138 which is rigidly fixed thereto, and this movement at once causes a pair of spaced resilient claws 156 on the tongue to embrace the nut at its recessed ends (FIG. 12). Each claw has a wedge-shaped or tapered end 158 which, in making contact with the nut, causes spreading of the resilient claws so as to admit the nut to the well or cage 160 in position as indicated by FIG. 12. When a stop 162 at the rear of cage 160 reaches the nut, said stop enforces advancement of the nut from its initial position at the bottom of the nut magazine.

It should here be noted that claws 156 have rearwardly extend resilient arms 164 terminating in a transverse mounting plate 166 riveted or otherwise fixed at 168 upon the tongue. Stop 162 may be a lug struck upwardly from the metal of the tongue.

Advancement of the nut by stop 162 causes the nut to abut the strut 170 of sub-slide 146, thereby to advance the sub-slide with the tongue a short distance determined by a pair of inwardly turned ears 206 integral with the sub-slide, which ride within parallel elongated slots 208 formed in the bottom wall 136 of housing 130. By the time the sub-slide reaches its forward limit of travel, a second nut drops from the magazine onto the sub-slide at aperture section 152 (see the nut N at the right in FIG. 12), where said second nut remains while the first nut (at the left in FIG. 12) continues its advancement with tongue 138.

As the tongue continues its advancement, the condition illustrated by FIG. 7 occurs. Here the tongue has tilted downwardly while carrying the nut N toward die 72. Such tilting of the tongue may be effected by a cam 178 having an inclined edge 176 which, in the course of tongue advancement, strikes an abutment 180 on the tongue to lower the tongue about pivots 124. Abutment 180 may be simply the rear edge of an elongate slot 182 formed in the tongue.

Cam 178 depends from a pivot pin 184 anchored to and spanning the stationary housing 130. The cam may be biased always to a substantially vertical position (FIG. 6), in clockwise direction, by a spring 186 having ends anchored to the cam and to a lug 188 struck upwardly from bottom wall 136 of housing 130. The cam normally is stopped against an abutment 190 of wall 136, said abutment being the forward end of a slot 192 of said wall. Cam 178 accordingly may move between the two extreme positions illustrated by FIGS. 8 and 9.

From the foregoing explanation it will be understood, by reference to FIG. 6, that advancement of tongue 138 to the left will bring abutment 180 into engagement with cam edge 176, and since the cam is stopped against abutment 190 the cam will remain immobile, thereby causing abutment 180 to override the cam edge 176 for lowering tongue 138 about its pivot 124. A somewhat further advancement of the tongue brings about the relationship of parts indicated upon FIG. 7, where the cam is about to drop into an aperture 192 of the tongue, thereby to permit upward flipping of the tongue under the influence of spring 144. At the time the tongue flips upwardly, the nut N will be located directly beneath die 72 for projection into the die recess as shown in FIG. 8. Then, upon manual retraction of tongue 138 and carriage 66, cam 178 will according to FIG. 9 leave the aperture 192 and ride upon the top surface of the tongue, until slot 182 registers with the cam and permits it to drop to the initial upright position.

In the meantime, nut N held within the recess of upper die 72, detaches itself from the resilient claws 156 by spreading the claws apart as the claws and tongue 138 recede from the die. This recession of the tongue and carriage 66 is manual, and is performed horizontally according to FIG. 9, until full retraction is reached. However, shortly prior to full retraction, the waiting nut N (at the right of FIG. 12), will be struck by the fixed abutment 194 of housing bottom 136 as sub-slide 146 retracts to initial position, thereby to displace the nut down the inclines 154—154, from aperture section 152 to aperture section 150, placing said nut in position for subsequent advancement to die 72.

Abutment 194 just mentioned, may be simply an edge of an opening 196 formed in the bottom wall 136 of stationary housing 130. This opening of course is always aligned with the stack of nuts in magazine 64.

As previously noted, sub-slide 146 is limited in its retractile movement by the upstanding lug 172 working within the short slot 174 of the housing bottom wall 136. If desired, though not necessarily, movement of the sub-slide in the advancing direction may be assisted by a weak spring 198, having one end anchored upon lug 172 while the opposite end 200 engages an edge of aperture 192 formed in tongue 138. Sub-slide, 146 is returned to initial retracted position by reason of the rear end 202 of the tongue striking and moving a depending lug 204 at the rear of the sub-slide, as the tongue and carriage 66 are manually retracted. A pair of inwardly turned ears 206 integral with the sub-slide, ride within parallel elongate slots 208 formed in the housing bottom wall 136 to suspend the sub-slide from said bottom wall for relative reciprocation. Such ears 206 may also be utilized to limit forward shifting of the sub-slide by the carriage tongue, the ears striking the forward ends of slots 208 to stop the sub-slide.

Referring to FIGS. 13, 17 and 18, the upper die 72 may surround a centering pin or finder 206 urged yieldingly downwardly by a spring 208, and having a pointed lower end 210 normally protruding from the die center. When spindle 44 is lowered toward the work sheet S, the pointed end of the pin or finder prick-punches the sheet, holding it solidly for descent of the die and penetration by the pierce nut N. Once the nut has pierced the sheet and produced the slug 56 (FIG. 14), pin point 210 will yieldingly project the slug through the lower die 88 which is open at the base of the machine, to discard the slug. Pin point 210 assists also in guiding the nuts successively into the upper die recess, as the nuts are projected to chuck pins 74 by the upward flipping action of the feeder detailed in FIG. 7.

The lower die 88, bored axially for release of slugs 56, may be mounted upon base 40 in precise alignment with upper die 72 in any suitable manner. It is desirable ordinarily to provide means for orienting one die to the other, and such means is indicated conventionally at 212 without resort to detail since same is of no consequence to the present invention.

The foregoing completes the description of the device as illustrated by FIGS. 1 to 18, inclusive.

The modified form, FIGS. 19 to 33, has many of the features of the device hereinbefore detailed but differs therefrom in certain respects, to be related.

It may be noted from FIGS. 19 and 20, that the modified device utilizes the same type of air hammer 90, that is, one which delivers a rapid succession of high frequency vibratory blows to die 72 so long as actuating lever 86 is swung and held at horizontal position. The lever so held disposes a lug 220 thereon in depressing relationship upon a rockable arm 222 (FIG. 20), which is fixed upon a rock shaft 224 that extends through a hollow boss 226 on arbor 42, wherein an air control valve (not shown) is located.

The operating stem of such a valve is indicated at 228 and carries a button head 230 to be shifted by swinging movement of a lever cam 232 fixed upon shaft 224. The arrangement is such that the valve feeds air for vibrating the hammer 90 only when lever 86 is depressed, with lug 220 holding arm 222 in a downwardly inclined position. Arm 222 normally is held elevated at the FIG. 20 position by a helical spring 234 (FIG. 19) on shaft 224. Compressed air to the valve is delivered through a fitting 236 at the rear of hand grip 238.

The means employed for advancing pierce nuts N to die 72, in the modification of FIGS. 19 to 33, may be described as follows.

By means of screws 240, there is suspended from arbor 42 an elongate housing 242 of inverted channel configuration, carrying a protective cover 244. Housing 242 has opposed parallel side walls 246—246 connected by a bottom wall 248. The side walls are provided with parallel elongated slots or ways 250, by which the carriage 66 is guided for manual reciprocation lengthwise of housing 242. A hand piece 68 may be provided to facilitate the shifting of the carriage.

Carriage 66 may be in the form of a channel piece having spaced parallel side walls 252—252 joined by a bottom wall or base 254, and securely fixed to the under face of 254 is a forwardly extending tongue 256. Rivets 258 are shown for securing the tongue to base 254. The tongue is adapted to feed nuts N from a magazine 64 successively to the upper die 72, as will be explained.

Slidability of carriage 66 may be aided by providing a sub-carriage 660, consisting of a pair of outer plates 260, and a pair of inner plates 262, bearing flatwise against the outer and inner faces, respectively, of the housing side walls 246. To the inner plates 262 are anchored two pairs of studs or pins 264 and 268, which pairs of studs or pins carry also the outer plates 260—260, and have sliding movement along the slots 250 of stationary housing 246. One of the outer plates 260 may include an outwardly extending integral bracket 270 for support of the hand piece 68.

The studs 264 pass through circular holes 272 formed in the side walls 252 of carriage 66 with sufficient clearance to permit tilting of the carriage slightly downwardly, in the manner of FIG. 7, whereas the other pair of studs 268 pass through openings 274 of said side walls, which are vertically elongated to limit the tilt of the carriage. Springs 276 are arranged between the carriage 66 and subcarriage 660, tending constantly to yieldingly urge carriage 66 upwardly or into parallelism with housing 242, about its pivotal mountings at 264.

The tongue 256 of carriage 66 is of sufficient length to deliver a nut N from the lower end of magazine 64 to spindle die 72, upon each forward advancement of the carriage. In advancing the carriage to deliver a nut to the die, the carriage and tongue 256 first move forwardly to withdraw a nut from the magazine; then as indicated by FIG. 7 the tongue is lowered while advancing, until the nut is in vertical alignment with die 72; whereupon the tongue snaps upwardly under the force of springs 276 to project the nut into the die recess according to FIG. 8; and finally, the tongue is withdrawn to the position of FIG. 6 or FIG. 21, after having deposited the nut in the die recess. Advancement and retraction of carriage 66 may be limited by the length of slots 250 in housing 242.

Intermediate the bottom wall 254 of the carriage and the bottom wall 248 of the stationary housing 242, there is disposed a reciprocable sub-slide 280 in the general form of an elongate plate, the forward end 282 of which is provided with a two-stage aperture comprising sections 284 and 286. Section 284 is of sufficient length and width to permit passage therethrough of a nut N whereas section 286 is of limited width such as to support a nut by its head, as in FIG. 27. Intermediate the aperture sections 284 and 286, there is provided a pair of spaced inclines 288 to be traversed by a nut N in passing from section 286 to section 284 of the sub-slide aperture.

Tongue 256 carries resilient claws 290 which receive a nut and deliver it to die 72, in the manner previously explained in connection with FIGS. 6 to 12. While the tongue 256 is not bifurcated like the tongue 138 previously described, its function is the same. Stop 292 is equivalent to stop 162 of FIG. 11. Also, the housing 242 has an opening 294 in registry with the base portion of magazine 64, performing the function of opening 196 in FIGS. 6 to 12.

FIG. 21 shows the nut feeding means in fully retracted position, with carriage 66 pulled back against stop 296 which depends from the rear end of sub-slide 280. Retraction of the carriage may be limited alternatively by pins 264 reaching the rear ends of housing slots 250.

Manual advancement of the carriage by means of handle 68, of course moves the attached tongue 256, and in the initial stage of advancement a pair of outwardly directed lugs 298 on the tongue move forwardly to strike a pair of depending abutments 300 on sub-slide 280, to begin advancing the sub-slide with the carriage. Forward advancement of the sub-slide is quite limited, and terminates when a nut from the magazine occupies the constricted aperture section 286 of the sub-slide.

A proper stopping point for the advancing sub-slide may be established by a detent 302 dropping into an aperture 304 of the sub-slide, the detent being mounted at one end of a leaf spring 306 fixed to housing 242 at 308. Detent 302 has a rounded nose as shown, whereby it may be lifted against the resistance of spring 306 by application of force lengthwise upon the sub-slide. A second aperture 310 in the sub-slide, aligned with and spaced from aperture 304, receives the detent as in FIG. 21 when the sub-slide is fully retracted. The detent arrangement serves to accurately position the sub-slide at its forward and rearward limits of travel.

In addition to detent means 302, the sub-slide is more positively stopped at its opposite limits by inwardly turned lugs 312 struck upwardly from the material of the sub-slide, and projecting through elongate slots 314 in the bottom wall of housing 242. The length of slots 314 determine the approximate limits of sub-slide travel, whereas detent 302 more accurately positions the sub-slide at its limits.

At approximately the time the sub-slide reaches its forward limit of travel (FIG. 22), a cam member 316 performs to tilt the tongue 256 downwardly about pivots 264 in the manner of FIG. 7, while the carriage 66 and tongue 256 continue to advance. FIG. 22 shows the cam member about to tilt the tongue. The cam member has an inclined cam face 318 to be struck by an advancing edge 320 of the tongue, which edge is depressed by the cam incline until the tip of the cam rides upon the upper face area 322 of the tongue. The length of face area 322 determines the distance the tongue will travel forwardly, while tilted.

As soon as the cam reaches the end 324 of face area 322, the cam will drop into aperture 326 of the tongue, whereupon springs 276 will snap the tongue upwardly about pivots 264 to the horizontal position of FIG. 8. At this instant, the nut carried by claws 290 will be projected upwardly into the recess 328 of die 72, FIG. 30. The carriage and tongue will then be manually retracted horizontally, with jaws 290 releasing the nut to the die recess. Release of the nut results from the nut spreading the jaws apart slightly as the tongue withdraws from the die.

With further reference to cam member 316, same may comprise a bar or plate suspended at one end from a pivot shaft 330 whose ends are anchored in the side walls 246 of stationary housing 242, FIG. 24. The cam member is biased forwardly against an abutment 332 of housing 242, by means of a spring 334 having opposite ends anchored to the cam member and to an upstanding lug 336 on the housing.

Figure 9:
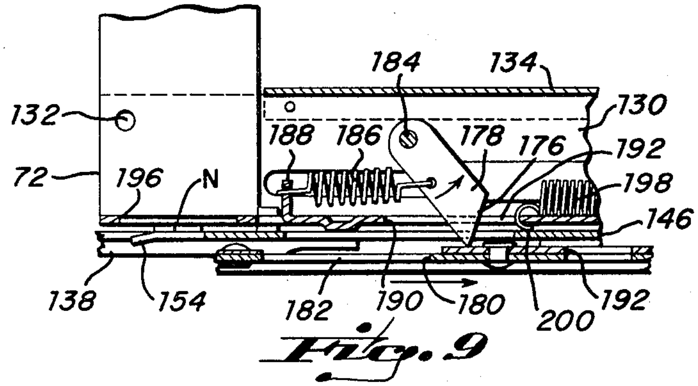

From the foregoing, it will be understood that cam member 316 normally is held upright against abutment 332, but may swing rearwardly to the position of FIG. 9 on the retractile stroke of the tongue and carriage 66. At full retraction of the tongue and carriage, the cam member overrides face area 322 of the tongue and assumes the normal upright position of FIG. 21 within registering slots 338 and 340 of the sub-slide and the stationary housing, respectively.

With reference to FIGS. 24 and 25, the sub-slide 280 may be shiftably suspended from the bottom wall 248 of housing 242, by sets of in-turned lugs 342 of the sub-slide riding in elongated slots 344 of the housing bottom, these being similar to the lugs and slots 312 and 314 (FIG. 25).

As was previously explained, the nut at the forward end of tongue 256 is deposited in the upper die 72 (FIG. 30) by an upward thrust of the tongue at the end of its forward travel. In accordance with FIG. 30, the die has an upright central bore 346 in which is mounted a nut chuck comprising a pair of depending resilient arms 348 each furnished at its lower end with a barb 350. The barbs are pointed outwardly and upwardly as shown, to engage the nut threads 352 for holding the nut yieldingly and releasably in suspension within die recess 328. Thus, the nut may be released from the die after the nut has been driven through the work sheet and attached hereto by repeated blows from pneumatic hammer 90.

The nut chuck of FIG. 30 may be suspended from a transverse pin 354 in bore 346, and yieldingly urged by a spring 356 in the direction of the die recess. The chuck may be formed from a single length of flat spring stock as indicated, and the barbs thereof are constantly urged apart by the inherent resiliency of the metal constituting the chuck.

FIGS. 31, 32 and 33, illustrate a means for mounting the lower die 88 upon the base portion 40 of the apparatus. The die as shown has a hollow shank 358, through which slugs may be ejected incident to driving the pierce nuts through the work sheet. Said shank is embraced within the upright bore 360 of a die mounting block 362 which is secured to the front end of base 40 by screws 364.

The die block 362 includes a seat 366 upon which rests the head of the die, and adjacent to the seat is an upstanding lip 368 against which a flat face 370 of the die head may abut to preclude rotation of the die. A locating pin 372 anchored in base 40 extends forwardly therefrom to engage a socket 374 in one side of the die block.

The locating pin may overlie a shoulder 376 on base 40, which shoulder provides support for an extending nose 378 of the die block, which rests thereon. Screws 364 pass through the block and into bores 380 of base 40, where the threaded ends of the screws engage the threads 382 of a transverse nut element 384. The nut element may comprise a rod or shaft passing through the base in a transverse bore 386.

Nut element 384 is transversely drilled and tapped near its ends, to receive the threaded ends of screws 364. Where the screws enter the tapped holes of the nut element, the latter may be slotted as at 388, the slots cutting through the nut element threads on a diameter. The purpose of the slots is to provide for a very close fitting of the threads of the screw into the threads 382 of the nut element, by slightly constricting the slots before lodging the nut element within its supporting bore 386 and threading the screws 364 into the threaded openings of the nut element. When and if necessary, the die block may be shimmed at 390 for orienting the lower die 88 with upper die 72.

The shank 358 of the lower die may be held in position by a ball 392, pressed normally against the shank by a spring 394 occupying a bore 396 provided in the die block. One end of the spring abuts the ball, while the opposite end bears against a transverse stop pin 398.

The nut magazine 64 of FIG. 21 differs from that of FIG. 6, in that the latter is a machined bar or rod broached out to render the nut passageway rectangular in cross-section, whereas in FIG. 21 the magazine is constituted of an outer cylinder 400 of tubular stock enveloping an inner sheet metal shape 402 which is rectangular in cross-section to accommodate a stack of nuts N. A removable cap 404 on the outer cylinder, held in place by a bayonet type connector 406, suspends a vertical rod 408 and a surrounding compression spring 410, the rod and spring being fixed centrally of the cap at 412. Rod 408 passes downwardly through the threaded openings of the majority of nuts N, while spring 410 bears upon the uppermost nut of the stack to assist gravitation of nuts successively onto the nut advancing means beneath the magazine. The rod may have a bulbous lower end 414 to facilitate entry of the rod through the threaded openings of the nuts.

The rectangular inner tube 402 may be secured within the outer cylindrical tube 400 in any suitable manner. In practice, the inner tube may be dimensioned to fit tightly within the outer tube, with a pressed fit, thereby to satisfactorily support the inner tube.

To use the device, the operator grasps the handle 68 and moves it forwardly toward the die station, this resulting in depositing a pierce nut in the recess of upper die 72. The handle then is retracted manually to home position, FIG. 21. Next, the operator places a work sheet horizontally upon the lower die 88, and pulls downwardly the lever 86. This lowers the upper die 72 and causes the pierce nut therein to contact the sheet. At the same time the high frequency pneumatic hammer is activated to drive the nut through the sheet and displace a punched-out slug such as 56 (FIG. 14). At the same time, the vibrating pneumatic hammer 90 will swage the material of the sheet about the nut, for producing a solid connection and shaping the dome 58, FIG. 3. Hammer 90 delivers a succession of high frequency impacts upon the upper die so long as lever 86 is held in the operative or lowered position, with its lug 220 depressing the air valve control member 222.

Upon return of lever 86 to the elevated or inoperative position of FIG. 20, valve control member 222 returns to normal position at which flow of air to the hammer is discontinued, and die 72 is elevated by spindle 44 to free the sheet and the attached nut for displacement from the machine.

The foregoing statement of operation applies to both forms of the machine illustrated.

Pierce nuts may be applied to metallic sheets as rapidly as the operator can insert and remove sheets from the die station, and all nuts will be found accurately and securely fixed to the sheet or sheets so treated. Since the machine is portable in character, it may be taken to the work or to the site of operation.

It is to be understood that various modifications and changes may be made in the structural details of the apparatus, within the scope of the appended claims, without departing from the spirit of the invention.

What is claimed is:

1. The method of securing to a metallic sheet member an element of the type which has a portion of reduced cross-sectional area intermediate upper and lower faces of the element, which method comprises the steps of:

(a) placing a face of said element against said sheet member, then (b) subjecting said element to high frequency vibratory impulses with a force sufficient for (1) driving said last mentioned face of the element intermittently into and through said sheet member to punch a slug therefrom, and (2) by continuing said impulses deforming and impacting portions of the sheet member immediately adjacent said element into the reduced cross-sectional area of said element.

2. The method of securing to a metallic sheet a pierce nut having a recessed portion of reduced cross-section in its side intermediate the upper and lower faces of the nut, said method comprising: driving one face of the nut intermittently through the sheet by applying to said nut a succession of high frequency mechanical impacts with force sufficient to displace a slug from said sheet and form an aperture in the sheet accommodating the reduced recessed portion of the nut, with the aperture margins closely adjacent to the nut sides at the reduced recessed portion thereof, and continuing the rapid succession of impacts upon said aperture margins for upsetting and flowing the metal of said margins into the recessed portion of the nut.

3. The method as set forth in claim 2, which includes embossing the metal of the sheet about the aperture thereof, to offset the nut from the mean plane of the sheet.

4. A portable, light weight impact tool for attaching to a metallic sheet a pierce nut having a recessed portion of reduced cross-section intermediate its upper and lower faces, said tool comprising:

(a) a pair of cooperative forming dies, (b) means for selectively moving one of said dies toward and from the other of said dies, (c) means for locating and releasably securing a pierce nut on said movable die, and (d) means for delivering a succession of high frequency impacts to the movable one of said dies for driving the lower face of the nut through the sheet for shearing a slug therefrom and for flowing portions of the metal of the sheet into the recessed portion of the nut.

5. A portable, light weight device for attaching to a metallic sheet a pierce nut having a recessed portion of reduced cross-section intermediate its upper and lower faces, said device comprising a pair of cooperative forming dies movable relatively to compress a metallic sheet therebetween, one of said dies including means for locating a pierce nut in position for driving of the nut partly through the sheet to shear a slug therefrom while the sheet is held compressed between the dies, and means for delivering a succession of impacts to one of the dies for so driving the nut and flowing a portion of the metal of the sheet into the recessed portion of the nut.

6. A portable, light-weight device for attaching to a metallic sheet a mounting element having a recessed portion of reduced cross-section intermediate upper and lower faces thereof, said device comprising a pair of cooperative forming dies movable relatively to compress a metallic sheet therebetween, and means for delivering a succession of impacts to one of the dies and an element carried thereby, for intermittently driving said element partly through the sheet to shear a slug therefrom, and for intermittently flowing a portion of the metal of the sheet into the recessed portion of said element.

7. A portable, light weight device for attaching to a metallic sheet a pierce nut having a recessed portion of reduced cross-section intermediate its upper and lower faces, said device comprising a vibratory member movable for intermittently driving a pierce nut partly through the sheet, to shear and displace a slug therefrom, and including a vibratory die for intermittently flowing a portion of the metal of the sheet into the recessed portion of the nut.

8. A portable, light weight device for attaching to a metallic sheet a pierce nut having a recessed portion in its side intermediate the upper and lower faces of the nut, said device comprising a stationary forming die to support the sheet, a reciprocable spindle movable toward and from the stationary die, and a second die movable with the spindle toward and from the stationary die for compressing the sheet between the dies, said second die having a recess therein to receive and releasably hold a pierce nut for projection by said second die partly through the sheet and the stationary die, means for successively projecting pierce nuts into the movable die recess while the movable die is retracted from the stationary die, means for manually advancing the spindle and the movable die with the nut carried thereby toward the stationary die and the intervening metallic sheet, and means operative incident to advancement of the movable die, for delivering a succession of impacts to one of said dies for driving the nut partly through the sheet and flowing a portion of the metal of the sheet into the recessed portion of the partially embedded nut.

9. The device as set forth in claim 8, wherein the dies include cooperative means to shape an embossed dome about the impacted nut, for disposing the nut in offset relationship to the plane of the sheet.

10. A portable, light weight device for attaching to a metallic sheet a pierce nut having a recessed portion in its side intermediate the upper and lower faces of the nut, said device comprising a base, and an arbor overlying the base in spaced substantial parallelism, a lower stationary forming die on the base to support a sheet, said die having a bore therein for receiving and discharging slugs punched from the sheet, a manually reciprocable spindle supported upon the arbor for movement toward and from the lower die, and means including a hand lever for reciprocating the spindle, an upper forming die carried by the lower end of the spindle and aligned with the lower die for compressing between the dies the sheet placed therebetween, said upper die having a recess therein to receive and hold a pierce nut to be projected partly through the sheet and the bore of the lower die, with punching-out of a slug from the sheet by the nut, a pneumatic hammer mounted atop the spindle adapted to deliver a rapid succession of impacts upon the upper die for driving the nut partly through the sheet and upsetting the metal of the sheet about the partially embedded nut, thereby to flow the metal into the recessed portion of the nut, a valve on the arbor for controlling delivery of compressed air to the hammer, said valve having a stem actuatable to open the valve and deliver air to the hammer only upon disposition of the spindle to a lowered position at which the upper die compresses the sheet against the lower die, means on the hand lever for so actuating the valve stem, and means slung beneath the arbor in spaced relation to the base, for successively feeding pierce nuts to the upper die recess when the spindle is elevated.

11. The device as set forth in claim 10, wherein the dies include cooperative means for embossing the sheet about the nut, to dispose the nut in offset relationship to the mean plane of the sheet.

12. A portable, light weight device for attaching to a metallic sheet a pierce nut having a recessed portion in its side intermediate the upper and lower faces of the nut, said device comprising a base, and an arbor overlying the base in spaced substantial parallelism, a lower stationary forming and punching die on the base to support a sheet, said die having an opening therein for receiving and discharging slugs punched from the sheet by the nut, a manually reciprocable spindle supported upright upon the arbor for movement toward and from the lower die, and means including a hand lever on the arbor for reciprocating the spindle, an upper forming die carried by the lower end of the spindle and aligned with the lower die for pressing the intervening sheet between the dies, said upper die having a recess therein to receive and releasably hold a pierce nut to be projected partly through the sheet and the slug opening of the lower die, with punching-out of a slug from the sheet by the nut, a pneumatic hammer mounted atop the spindle adapted to deliver a rapid succession of impacts upon the upper die for driving the nut partly through the sheet and upsetting the metal of the sheet about the partially embedded nut, thereby to flow the metal of the sheet into the recessed portion of the nut, a valve on the arbor for controlling delivery of compressed air to the hammer, means operative incident to lowering of the spindle for delivering air to the hammer for actuating the latter, and manually operable means disposed between the arbor and the base for successively feeding pierce nuts to the upper die recess when the spindle is in elevated position.

13. The device as set forth in claim 12, wherein the dies include cooperative means for forming a dome in the metallic sheet about the nut, to dispose the nut in offset relationship to the mean plane of the sheet.

14. A portable, light weight device for attaching to a metallic sheet a pierce nut having a recessed portion in its side intermediate the upper and lower faces of the nut, said device comprising a base, and an arbor overlying the base in spaced relation thereto, a lower stationary forming and punching die on the base to support a sheet, said die having an opening therein for receiving and releasing slugs punched from the sheet by the nut, a manually reciprocable spindle supported upright upon the arbor for movement toward and from the lower die, an upper forming die carried by the lower end of the spindle and aligned with the lower die for pressing the sheet between the dies, said upper die having a recess therein to receive and releasably hold a pierce nut to be projected thereby partly through the sheet interposed between the dies, upon lowering of the spindle, impact means operative upon lowering of the spindle, for driving a portion of the metal of the sheet into the recessed portion of the pierce nut, to effect fixation of the nut upon the sheet, and a feeder of pierce nuts comprising an elongate housing fixed between the arbor and the base, a manually reciprocable carriage mounted on the housing for movement toward and from the spindle axis, a tongue movable with the carriage and having a free end including a nut holder for releasably supporting and carrying a pierce nut beneath and in alignment with the upper die recess while the spindle is elevated, means operative concurrently with advancement of the carriage, to tilt the free end of the tongue away from the upper die and toward the lower die, spring means on the carriage and operative upon the tongue to project the free end of the tongue forcefully toward said upper die for depositing within the recess thereof the pierce nut carried by the releasable nut holder, said nut holder releasing the nut to the die recess upon retraction of the carriage and tongue laterally from the upper die, and a magazine for successively feeding pierce nuts to the holder upon each complete reciprocation of the carriage.

15. The device as set forth in claim 14, wherein the upper die includes a chuck to releasably retain a pierce nut while the spindle advances the nut toward the lower die.

16. A portable, light weight device for attaching to a metallic sheet a pierce nut having sides intermediate the upper and lower faces of the nut, said device comprising a base, and an arbor overlying the base in spaced relation thereto, a lower stationary forming and punching die on the base to support a sheet, said die including means for discarding slugs punched from the sheet by the nut, a manually reciprocable spindle supported upright upon the arbor for movement toward and from the lower die, an upper forming die carried by the lower end of the spindle and aligned with the lower die for pressing the sheet between the dies, said upper die having a recess therein to receive and releasably hold a pierce nut to be projected partly through the sheet interposed between the dies, upon lowering of the spindle, a hammer for delivering a rapid succession of impacts upon one of the dies for projecting the nut partly through the sheet and upsetting and flowing a portion of the metallic sheet against the sides of the partially embedded nut, means operative incident to descent of the spindle to activate said hammer, and a feeder of pierce nuts comprising a support mounted upon the arbor, a reciprocable carriage mounted on the support for movement toward and from the spindle axis, a tongue movable with the carriage and having a free end including a nut holder for releasably supporting and carrying a pierce nut beneath and in alignment with the upper die recess while the spindle is elevated, and means operative to project into the die recess the pierce nut carried by the releasable nut holder prior to movement of the carriage to retracted position.

17. The device as set forth in claim 16, wherein is included in the upper die recess a chuck to releasably retain a pierce nut while the spindle advances the nut toward the lower die.

18. In a device for attaching to a metallic sheet a pierce nut having an internally threaded hole, and sides intermediate the upper and lower faces of the nut, said device comprising a pair of cooperative forming dies movable relatively to compress a metallic sheet therebetween, one of said dies including a recess for locating a pierce nut in position for projection of the nut partly through the sheet while the latter is compressed between the dies, and means for releasably holding the nut within the die recess, said means comprising a pair of resilient arms extending in the direction of die movement and adapted for entry into the threaded hole of the nut, and means on the end portions of the arms for frictionally and releasably engaging the threads of the nut.

19. The combination as set forth in claim 18, wherein the means last mentioned consist of outwardly directed barbs on the end portions of the arms urged constantly outwardly by the resiliency of the arms to releasably engage the nut threads.

References Cited

UNITED STATES PATENTS

| | | | |
|---|---|---|---|
| 2,393,131 | 1/1946 | Vang. | |
| 3,001,279 | 9/1961 | Sherrill. | |
| 619,809 | 2/1899 | Unser. | |
| 2,058,319 | 10/1936 | Jones. | |
| 2,593,506 | 4/1952 | Wales | 29—432 X |
| 2,652,942 | 9/1953 | Muchy. | |
| 2,687,522 | 8/1954 | Juilfs | 227—130 X |
| 2,707,322 | 5/1955 | Strain et al. | 29—432 |
| 2,749,606 | 6/1956 | Donahue | 29—432 |
| 2,997,713 | 8/1961 | Anstett | 227—130 X |
| 3,108,368 | 10/1963 | Steward | 29—432 |
| 3,184,353 | 5/1965 | Balamuth et al. | 29—432 X |
| 3,224,086 | 12/1965 | Balamuth | 29—526 X |

CHARLIE T. MOON, *Primary Examiner.*